United States Patent [19]

Hegel et al.

[11] 3,917,309
[45] Nov. 4, 1975

[54] VEHICLE LEVELING SYSTEM

[75] Inventors: Robert W. Hegel; Burke A. West, both of Monroe, Mich.

[73] Assignee: Monroe Auto Equipment Company, Monroe, Mich.

[22] Filed: July 18, 1974

[21] Appl. No.: 489,728

[52] U.S. Cl. .......... 280/124 F; 60/DIG. 2; 267/65 D
[51] Int. Cl.² ........................................ B60G 13/14
[58] Field of Search ..... 280/124 F; 267/64 R, 65 R, 267/65 D; 60/DIG. 2, 423, 431

[56] References Cited
UNITED STATES PATENTS

| | | | |
|---|---|---|---|
| 3,070,954 | 1/1963 | Basso | 60/DIG. 2 |
| 3,104,119 | 9/1963 | Long | 280/124 F |
| 3,232,306 | 2/1966 | Miller | 280/124 F |
| 3,393,921 | 7/1968 | Wilkins | 280/124 F |
| 3,592,485 | 7/1971 | Buhl | 280/124 F |
| 3,618,972 | 11/1971 | Buhl | 280/124 F |
| 3,653,676 | 4/1972 | Higginbotham | 280/124 F |
| 3,687,480 | 8/1972 | Fader | 267/65 D |
| 3,716,251 | 2/1973 | Klees | 280/124 F |

*Primary Examiner*—Philip Goodman
*Assistant Examiner*—John A. Carroll
*Attorney, Agent, or Firm*—Harness, Dickey & Pierce

[57] ABSTRACT

A vehicle leveling system adapted for varying the attitude between the sprung and unsprung portions of an automotive vehicle, the system including a pair of leveling struts interposed between the vehicle portions and operable in response to an increase in fluid pressure supplied thereto to elevate the sprung portion of the vehicle relative to the unsprung portion thereof, and operable in response to a decrease in fluid pressure supplied thereto to lower the sprung portion of the vehicle relative to the unsprung portion thereof, an electrically energized means for supplying pressurized fluid to the struts and fluid circuit means communicating a pressurized fluid to the struts, and a control device located within the interior of the associated vehicle and operable by the vehicle driver, with the control means including first and second control elements, the first control element including electric switch for opening and closing an electrical circuit communicating a source of electrical energy with the fluid pressure supply means and the second control element comprising valve means communicable with the fluid circuit for selectively communicating the fluid circuit with the atmosphere.

47 Claims, 10 Drawing Figures

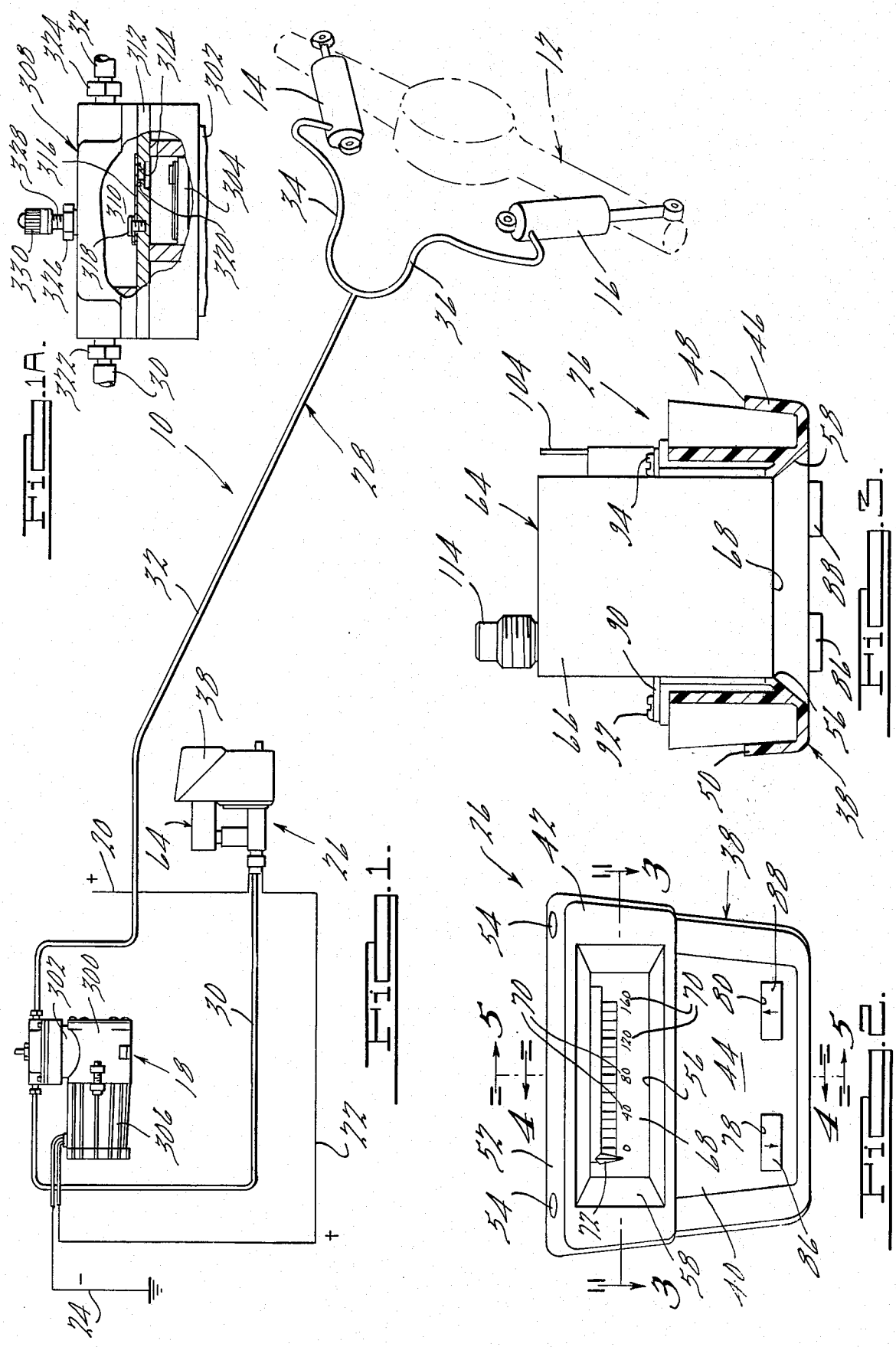

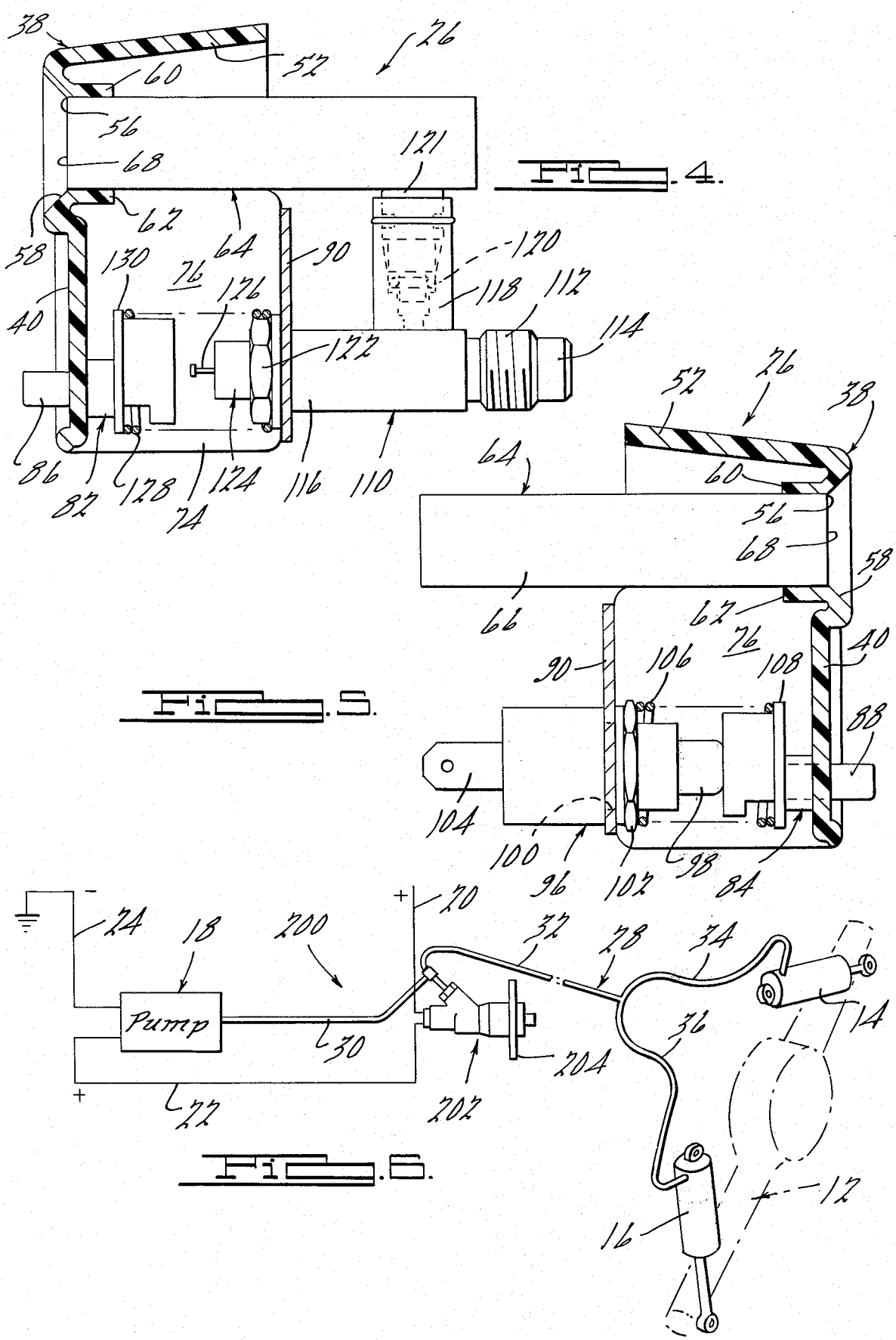

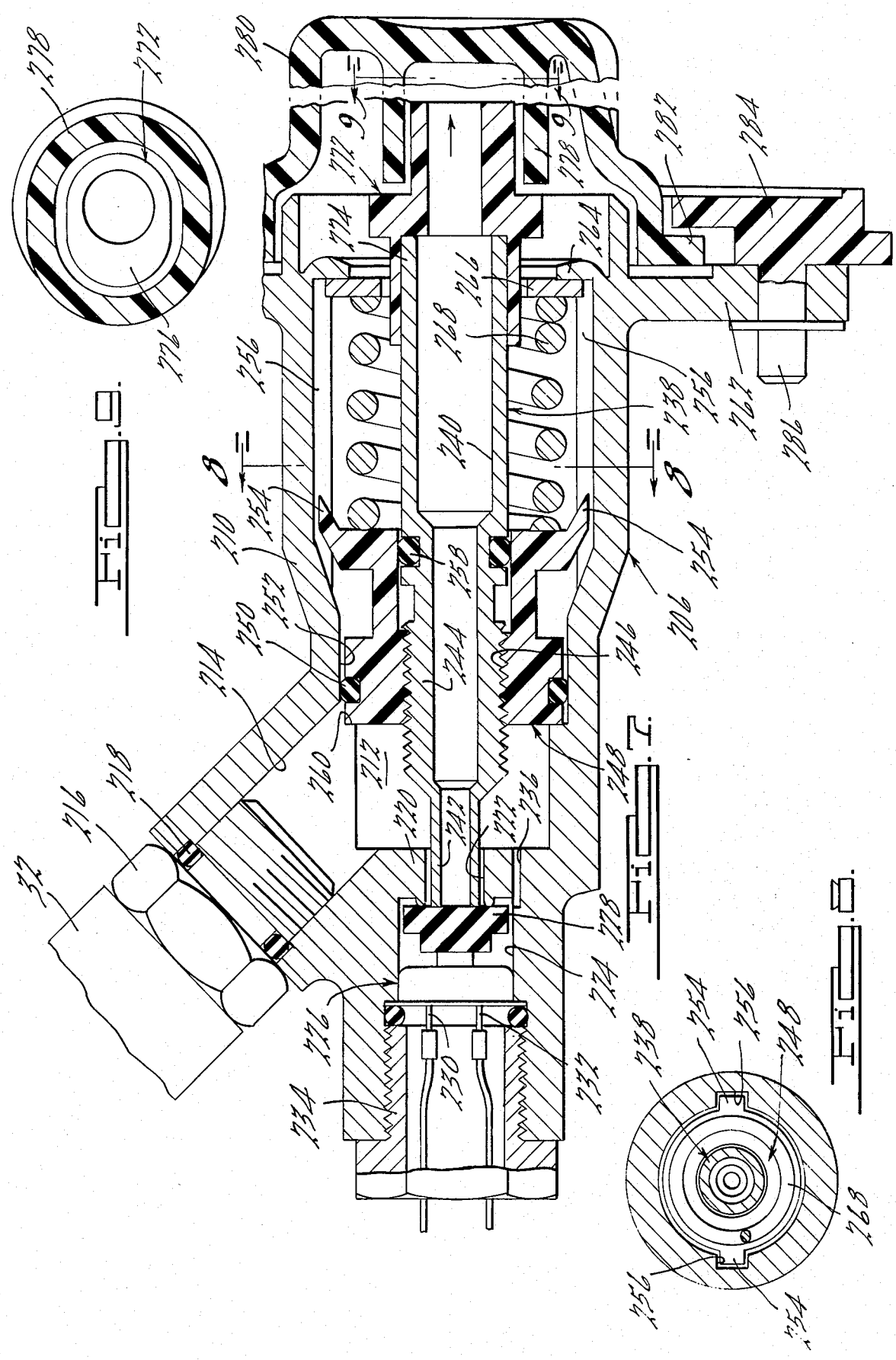

VEHICLE LEVELING SYSTEM

SUMMARY OF THE INVENTION

The present invention generally relates to an automotive vehicle's suspension system incorporating a pair of leveling struts, preferably in the form of combination shock absorber and supplementary air spring units, that are adapted to be placed between the sprung mass of the vehicle and the unsprung mass thereof in the same general location as conventional shock absorbers normally assume in a vehicle suspension system, whereby the supplementary air spring units will aid or complement the main suspension springs of the vehicle in supporting the sprung mass of the vehicle upon the unsprung mass thereof.

As is well known in the art, the main suspension springs for a vehicle are engineered to provide a desired ride effect in a particular vehicle. Traditionally, direct acting tubular shock absorbers are positioned between the sprung mass and unsprung mass of a vehicle adjacent the main suspension springs to damp movements of the sprung mass and unsprung mass of the vehicle. In the present invention, a pair of direct acting tubular-type shock absorbers are provided with supplementary air spring units that are adapted to be operated either in a deflated condition or in an inflated condition, depending upon whether or not supplementary or aiding support is required between the sprung mass and the unsprung mass of the vehicle to maintain the vehicle in the level condition. Under normal operating conditions, the vehicle is designed to carry an average load condition of passengers and baggage, but even under these conditions there are times when the passenger load and baggage load becomes excessive so that the rear end of the vehicle tends to sag. Under these conditions, or under extra heavy loaded conditions, such as when a boat or house trailer is being drawn by the vehicle, the supplementary air springs can be pressurized with a suitable fluid, such as air, to assist in supporting the added load and thereby aid the main suspension springs of the vehicle. Conversely, under conditions of operation of the vehicle wherein the supplementary air spring units are not required to give any substantial aid in the main suspension spring of the vehicle, the supplementary air spring units will operate in a deflated condition.

The leveling system of the present invention features a control device or console located within the vehicle driver's compartment and at a conveniently accessible location to the vehicle driver. The control console includes control elements in the form of a pair of push buttons or a rotatable knob, which functions to control actuation of an electrical switch that is in electrical communication with a source of electrical energy and an electrically energized air compressor. At such time as it is desired to inflate the air spring units, it is merely necessary to actuate the push button (or rotate the knob) and thereby energize the compressor for a predetermined period of time. The associated control element is designed to be actuated so as to vent the fluid circuit communicating the compressor with the leveling struts to the atmosphere so as to permit deflation of the struts when it is desired to lower the sprung portion of the vehicle relative to the unsprung portion thereof during substantially unloaded vehicle conditions. In addition to the control elements, the control console may be provided with a gauge for providing a visual indication of the pressure condition within the supplementary air spring units so that it is possible for a vehicle operator to correlate a desired level condition with a predetermined pressure setting.

It is accordingly a general object of the present invention to provide a new and improved vehicle leveling system.

It is a more particular object of the present invention to provide a new and improved leveling system which incorporates a control module located within the vehicle driver's compartment for selectively actuating and deactuating an associated electrically energized air compressor and for selectively venting the fluid circuit with the atmosphere to permit lowering of the sprung portion of the vehicle relative to the unsprung portion thereof.

It is another object of the present invention to provide a new and improved leveling system of the above-described type which may be operatively associated with an air regulator device.

It is a further object of the present invention to provide a new and improved control console for use in a vehicle leveling system which incorporates a pressure gauge for displaying the pressure condition within the system and which includes a novel valving arrangement for operatively communicating the fluid circuit with the gauge and with a pressure venting device.

It is still another object of the present invention to provide a new and improved vehicle leveling system which is of a relatively simple design, is economical to manufacture and which will have a long and effective operational life.

It is yet another object of the present invention to provide a new and improved vehicle leveling system which includes an electrically energized compressor having a manifold chamber into which compressed air is supplied, which chamber is communicable with the associated leveling struts, with the associated control console, and includes an auxiliary fitting by which pressurized air may be used, for example, for inflating vehicle tires, air mattresses or any other suitable purpose.

Other objects and advantages of the present invention will become apparent from the following detailed description taken in conjunction with the accompanying drawings.

BRIEF DESCRIPTION OF THE DRAWINGS

FIG. 1 is a schematic representation of one embodiment of the leveling system in accordance with the present invention;

FIG. 1A is an enlarged fragmentary side elevational view, partially broken away, of the manifold chamber incorporated in the compressor of the leveling system shown in FIG. 1;

FIG. 2 is a front elevational view of the control console incorporated in the leveling system shown in FIG. 1;

FIG. 3 is a longitudinal cross-sectional view taken substantially along the line 3—3 of FIG. 2;

FIG. 4 is a transverse cross-sectional view taken substantially along the line 4—4 of FIG. 2;

FIG. 5 is a transverse cross-sectional view taken substantially along the line 5—5 of FIG. 2;

FIG. 6 is a schematic representation of an alternate embodiment of the leveling system of the present invention;

FIG. 7 is a transverse cross-sectional view of the air supply and regulating assembly incorporated in the leveling system shown in FIG. 6;

FIG. 8 is a transverse cross-sectional view taken substantially along the line 8—8 of FIG. 7; and FIG. 9 is a transverse cross-sectional view taken substantially along the line 9—9 of FIG. 7.

DESCRIPTION OF THE PREFERRED EMBODIMENT

Referring now in detail to the drawings and in particular to FIG. 1 thereof, a vehicle leveling system 10, in accordance with one preferred embodiment of the present invention, is shown in operative association with an automotive vehicle comprising an unsprung portion, such as a rear axle 12, which is provided with a pair of leveling struts 14 and 16 that extend between the axle 12 and the sprung portion (not shown) of the associated vehicle. Typically, although not necessarily, the struts 14, 16 comprise air adjustable shock absorbers of the type well known in the art. The leveling struts 14, 16 are adapted to be operatively associated with a source of fluid pressure, generally designated by the numeral 18, which comprises an electrically energized air compressor that is capable of delivering approximately 150 p.s.i. to the leveling struts 14, 16. A compressor of a type similar to that sold and distributed by Thomas Industries, Inc., of Sheboygan, Wisconsin, and identified as Model No. 405ADC38 has been found to be satisfactory. Various other types of air compressors or pumps, of course, will also be readily adapted to the leveling system 10 of the present invention, as will be appreciated by those skilled in the art.

The air compressor 18 is connected to a suitable source of electrical energy 20, such as the vehicle battery, by means of conductors 22 and 24, which constitute an electrical circuit that is controlled by a control console, generally designated by the numeral 26, the construction and operation of which will hereinafter be described in detail. The air compressor 18 is also connected with the leveling struts 14, 16 by means of a fluid circuit, generally designated 28, which consists of a first conduit 30 extending between and communicating the compressor 18 and console 26, and a second conduit 32 extending between the compressor 18 and a pair of branch conduits 34, 36 which are respectively connected to the struts 14, 16. Briefly, in operation of the leveling system 10, at such time as it is desired to raise the sprung portion of the vehicle relative to the unsprung portion thereof, the control console 26 is appropriately actuated so as to effect energization of the compressor 18, resulting in pressurized air being communicated to the struts 14, 16. The struts 14, 16 thereby expand and cause the rear end of the associated vehicle to be raised relataive to the unsprung portion or axle 12 thereof. In the event it is desired to lower the rear end of the associated vehicle, the control console 26 is again appropriately actuated, whereby the fluid circuit 28 is vented to the atmosphere, resulting in contraction of the struts 14, 16 whereupon the rear end of the vehicle will be lowered relative to the axle 12. It is to be noted that while the leveling system 10 is depicted herein as being operatively associated with the leveling struts 14, 16 and rear axle 12 of a vehicle, the present invention is not intended to be so limited since it will find ready application in connection with leveling struts associated, for example, with the front end of a vehicle.

Referring now in detail to the construction and operation of the control console 26, as best seen in FIGS. 2-5, the console 26 includes a mounting bezel, generally designated 38, which is preferably fabricated of a molded plastic material and includes a face section 40 comprising upper and lower face portions 42 and 44, respectively. The bezel 38 comprises a peripheral flange section 46 which extends along the sides and top thereof and includes a pair of opposed side portions 48 and 50 and a top portion 52, the latter of which is formed with suitable mounting or attachment openings 54 through which suitable screws, bolts or other attachment means may extend for securing the bezel 38 and hence the entire control console 26, to a readily accessible portion within the vehicle, such as upon the underside of the vehicle dashboard or the like, wherein the operator or other person within the vehicle will have convenient access to the console 26.

The upper face portion 42 is formed with a central elongated opening 56, the periphery of which is defined by inwardly tapered or inclined areas 58, with the upper and lower sides of the opening 56 being formed with rearwardly extending upper and lower flanges 60 and 62, respectively. Disposed between the flanges 60, 62 and extending rearwardly from the face section 40 of the bezel 38 is a pressure gauge assembly, generally designated by the numeral 64. The assembly 64 comprises a generally rectangular-shaped body 66 that contains a suitable pressure responsive device, such as a Bourdon tube, electrical transducer or the like which functions to convert a fluid pressure force or condition into a visible indication thereof. In particular, the assembly 64 includes a front face 68 which is visible or viewable through the opening 56 and is provided with suitable indicia 70 with which a pointer 72 is selectively movable. The pointer 72, of course, is connected via a suitable actuating linkage or the like to the pressure responsive means within the body 66, whereupon the particular pressure condition transmitted thereto is indicated on the face 68 by the pointer 72 moving into alignment with the appropriate pressure indicating indicia 70.

Disposed below the assembly 64 is an enclosed or shrouded portion of the bezel 38, which portion is generally designated by the numeral 74 and defines an interior chamber 76. The lower face portion 44 of the face section 40 is formed with a pair of laterally spaced openings 78 and 80 which are communicable with the interior of the chamber 76. Disposed directly rearwardly of the openings 78, 80 is a pair of control elements, generally designated by the numerals 82 and 84, which include forwardly projecting actuating or push button portions 86, 88 respectively, that project outwardly through the openings 78, 80 respectively, and are adapted to be manually engaged by the vehicle operator in a manner hereinafter to be described. Located at the rearward side of the enclosed or shrouded portion 74 of the bezel 38 is a mounting plate, generally designated by the numeral 90, which is secured to the portion 74 by means of suitable screws 92 and 94. The plate 90 functions to operatively support an electrical switch 96 that includes a reciprocable actuating portion 98, as best seen in FIG. 5. The switch 96 is preferably of the normally open, single pole, single throw type, one satisfactory type of which is manufactured by Cutler-Hammer and is identified by Model No. 8444-K4. The switch 96 extends through an opening 100 in the mounting plate 90 and is secured thereto by means of a suitable threaded nut or the like 102. As is conventional in the art, the switch 96 includes a pair of spade-like contacts 104 which are connected by suitable terminal means to the electric circuit operatively connecting the control console 26 with the source of electrical energy 20. Extending around the periphery of the inner end of the switch 96 is a helical coil spring 106, the rearward end of which bears against the nut 102 and the forward end of which bears against a peripheral shoulder 108 formed around the control element 84. As will be appreciated, the spring 106 functions to bias the control element 84 forwardly to the position shown, for example, in FIG. 5 and as such permits the switch 96 to be normally open until such time as the push button portion 88 is depressed inwardly, whereupon the switch 96 will be closed to complete an electrical circuit to the compressor 18.

Disposed directly rearwardly of the control element 82 is a T-valve assembly, generally designated by the numeral 110. The assembly 110 includes an inlet leg or portion 112 which is provided with fitting means 114 adapted to be operatively connected to the conduit 30. The assembly 110 also includes a valve leg or portion 116 which is longitudinally aligned with the inlet leg 112 and both of which legs 112, 116 are longitudinally aligned with the control element 82. Additionally, the T-valve assembly 110 includes an upwardly extending leg 118 which is provided with suitable O-ring sealing means 120 and adapted to be sealingly engaged with a downwardly extending fitting or attachment portion 121 provided on the underside of the body 66 of the pressure gauge assembly 64. As will be appreciated, the T-valve assembly 110 provides for fluid pressure communication between the conduit 30 and the interior of the pressure gauge assembly 64 so that said assembly 64 will register the pressure condition within the conduit 30 and hence with the entire fluid circuit 28.

The valve leg 116 of the assembly 110 extends through a suitable opening in the mounting plate 90 and is provided with a suitable threaded nut 122 for retaining the assembly 110 in the position shown in FIG. 4. Disposed within the valve leg 116 of the assembly 110 is a schrader valve assembly, generally designated by the numeral 124, which is of a construction well known in the art and includes a forwardly projecting valve stem or actuating portion 126 that is located directly rearwardly of the control element 82 and adapted to be engaged therewith upon rearward movement of the push button portion 86 of the element 82. The valve assembly 124 is adapted to communicate the interior of the T-valve assembly 110 with the atmosphere so that at such time as the actuating portion 126 is depressed inwardly, the fluid circuit 28 will be vented to the atmosphere to relieve the pressure within the circuit 28 and hence within the struts 14, 16. It will be noted that the compressor 18 is provided with a check valve (hereinafter to be described) so that the interior thereof will not be vented to atmosphere upon actuation of the control element 82. A helical coil spring 128, similar to the aforedescribed spring 106, extends between the nut 122 and a peripheral shoulder 130 on the control element 82 and functions to yieldably maintain the element 82 in a position shown in FIG. 4, yet permit the push button portion 86 thereof to be depressed, whereupon the rearward end of the element 82 will engage and actuate the portion 126 of the schrader valve assembly 124.

It is to be noted that the control console 26 may be provided with a suitable illuminating means to permit the operator of the vehicle to view the gauge assembly 64 under low light conditions, and the electrical circuitry associated with the console 26 may also be provided with a suitable safety fuse or the like of the type well known in the art; however, each of these features has been omitted from the present description for purposes of conciseness of description since they do not contribute materially to the principles of the present invention.

In operation of the leveling system 10, assuming that the compressor 18 is connected to the source of electrical energy 20, at such times as it is desired to raise the end of the vehicle associated with the leveling struts 14, 16, the push button portion 88 of the control element 84 is depressed inwardly, whereupon the actuating portion 98 of the switch 96 will be depressed to cause the switch 96 to close a circuit between the source 20 and the compressor 18. Accordingly, the compressor 18 will be energized and pressurized air will be communicated by the fluid circuit 28 to the leveling struts 14, 16, resulting in extension thereof, whereupon the associated vehicle portion will be elevated. The compressor 18 will remain energized as long as the control element 84 is depressed inwardly to cause the switch 96 to be closed. At such time as the portion of the vehicle associated with the leveling struts 14, 16, has been elevated to the desired level, the vehicle operator may merely release the push button portion 88 of the control element 84, whereupon the spring 106 will bias the control element 84 outwardly, hence permitting the switch 96 to open and thereby effect deenergization of the compressor 18.

At such time as it is desired to permit the elevated portion of the vehicle associated with the struts 14, 16, to be lowered, the control element 82 is actuated by depressing the push button portion 86 thereof. When this occurs, the actuating portion 126 of the schrader valve assembly 124 is depressed inwardly, whereupon the valve assembly 124 vents the fluid circuit 28 and hence the leveling struts 14, 16 with the atmosphere, whereupon the weight of the sprung portion of the vehicle will cause the struts 14, 16 to collapse. When the struts 14, 16 have been predeterminately collapsed to a position wherein the sprung portion of the vehicle, for example, is level, the operator may merely release the push button portion 86 of the control element 82, whereupon the spring 128 will bias the control element 82 out of engagement from the schrader valve assembly 124 and hence permit the assembly 124 to close and thus prevent further venting of the fluid circuit 28. Due to the communication of the pressure gauge assembly 64 with the fluid circuit 28 via the T-valve assembly 110, the pressure within the circuit is continuously monitored and indicated by the interaction of the pointer 72 and pressure indicating indicia 70, as will be appreciated by those skilled in the art.

Referring now in detail to FIGS. 6-9 wherein a modified embodiment of the present invention is illustrated, a vehicle leveling system 200 is shown as comprising identical components to the aforedescribed leveling system 10, with the exception that the system 200 includes a control module or console 202 instead of the above described console 26. The console 202 includes a mounting bezel or the like 204 which is adapted to be mounted, for example, upon the dashboard of the associated vehicle at some conveniently accessible position to the vehicle operator. Mounted upon the bezel 204 is an air supply and regulator assembly 206 which is adapted to control energization of the associated compressor 18 so that compressed air is supplied to the associated leveling struts 14, 16. More particularly and as best shown in FIGS. 7–9, the assembly 206 includes an elongated housing 210 defining an internal chamber 212. The housing includes an inlet port 214 which is communicable with the chamber 212 and is provided with a suitable fluid fitting 216 and O-ring sealing means 218 for securing and providing a fluid-tight seal between the interior of the port 214 and the associated fluid conduit 32. Disposed at the left end of the housing 210 as the same is viewed in FIG. 7, is an end wall 220 which is formed with a central opening 222. Disposed on the opposite side of the end wall 220 from the chamber 212 is a counterbored cavity 224 within which an electric switch assembly 226 is located. The switch assembly 226 may be similar in structure and operation to the aforedescribed switch 96 and as such includes a reciprocable actuating portion 228 which is aligned with the opening 222. The switch assembly 226 also includes a pair of terminals 230, 232 which are adapted to be connected via suitable conductors, such as the conductors 222, 224, with the associated compressor 18 and source of electrical energy 20. The switch assembly 226 normally maintains an open circuit between the compressor 18 and energy source 20 and such circuit is closed or completed at such time as the actuating portion 228 is biased toward the left in FIG. 7. The entire switch assembly 226 is retained within the cavity 224 by means of a suitable threaded plug or the like 244, as illustrated. A suitable pressure equalizing passage 236 extends between the chamber 212 and the cavity 224 to maintain equal pressure conditions on the opposite sides of the actuating portion 228.

Extending longitudinally within the chamber 212 is an elongated generally cylindrically-shaped stem member 238 which is formed with a coextensive central passage 240. The end of the stem member 238 adjacent the end wall 220 is formed with a reduced diameter portion 242 which extends through the opening 222 and is adapted for engagement with the actuating portion 228 of the switch assembly 226. The stem member 238 is also formed with an intermediate externally threaded portion 244 which extends through and is threadably connected within a bore 246 of a piston 248 which is disposed within the chamber 212. The outer periphery of the piston 248 is provided with sealing means 250 adapted for sliding sealing engagement with the inner periphery or wall 252 of the chamber 212. The end of the piston 248 opposite the sealing means 250 is provided with outwardly projecting key portions 254 which are longitudinally slidably disposed within internal splines 256 formed within the interior of the chamber 212 at the end thereof opposite the end wall 220. Suitable sealing means in the form of an O-ring 258 is provided between the outer periphery of the stem member 238 and the inner periphery of the piston 248, as illustrated. A suitable radially extending shoulder 260 is formed within the chamber 212 and limits leftward movement of the piston 248 therewithin. It will be seen that upon rotation of of the stem member 238, the piston 248 will be longitudinally adjusted within the chamber 212, with the interacting key portions 254 and splines 256 functioning to prevent rotation of the piston 248 upon rotation of the stem member 238.

The end of the housing 210 opposite the cavity 224 is formed with an outwardly extending mounting flange 262 which is adapted to be secured by any suitable means to the bezel 204. The end of the housing 210 adjacent the flange 262 is formed with a radially inwardly extending flange portion 264 which acts as a support for a ring 266 against which one end of a helical coil spring 268 bears. As shown in FIG. 7, the spring 268 extends around the outer periphery of the stem member 238 generally coaxially thereof and the end of the spring 268 opposite the ring 266 bears against the confronting side of the piston 248. The spring 268 serves to exert a leftwardly directed force on the piston 248 and hence upon the stem member 238 and is intended to counteract the force of the fluid pressure within the chamber 212 on the opposite side of the piston 248 from the spring 268, in a manner hereinafter to be described.

Means for rotating the stem member 238 and thereby longitudinally adjusting the position of the piston 248 along the member 238 comprises a dog element 272 which is secured in a press fit about an outer knurled end portion 274 of the stem member 238. The dog element 272 has its distal end 276 formed of oblong contour (see FIG. 8) and is received freely into a central skirt 278 of a control element or knob 280 with freedom for axial movement relative to the knob 280. The knob 280 is formed with an outwardly extending peripheral flange 282 by which it is held in the central opening of a securing plate 284. The plate 284 is in turn provided with suitable axially extending retaining pins 286 which are cooperable with the mounting flange 260 for retaining these components together.

In operation of the control console 202 and in particular the air supply and regulator assembly 206, the position of the stem member 238 relative to the piston 248 is adjusted by selectively rotating the stem member 238 and thus the position of the end portion 242 relative to the switch assembly 226 is controlled through rotation of the stem member 238. The further to the left the stem member 238 is turned, the greater will be the force required to work on the leftward face of the piston 248 in order to cause the end portion 242 of the stem member 238 to move away from the actuating portion 228 of the switch assembly 226. With the stem member 238 set at a preselected position relative to the piston 248, compressed air is supplied through the inlet port 214 from the associated fluid circuit communicating the compressor 18 with the leveling struts 14, 16. At such time as the compressor 18 is deenergized and the leveling struts 14, 16 are in a non-expanded condition, there would be no air pressure working against the leftward face of the piston 248. Assuming that the stem member 238 is properly advanced, the end portion 242 thereof will engage and depress the actuating portion 228 of the switch assembly 226 to effect energization of the compressor 18 to cause expansion of the leveling struts 14, 16. As the pressure builds up within the fluid circuit 28 and hence within the chamber 212, such pressure will ultimately reach a point where the working force on the leftward face of the piston 248 exceeds the force of the spring 268 working against the rightward end of the piston 248. This will cause the piston 248 and stem 238 to move to the right, whereupon the end portion 242 of the stem member 238 will be moved away from the switch assembly 226, permitting the actuating portion 228 to be moved to a position deactuating the assembly 226 and thus opening the electrical circuit to the compressor 18. A subsequent drop in pressure within the chamber 212 will reduce the rightward force on the piston 248 and enable the spring 268 to force the stem member 238 toward the left and thus effect reactuation of the switch assembly 226. At such time as it is desired to permit contraction or deflation of the leveling struts 14, 16 and thus lowering of the associated vehicle portion, the stem member 238 is rotated by means of the knob 280 such that the end portion 242 of the member 238 is moved away from the adjacent side of the actuating portion 228 of the switch assembly 226. When this occurs, the interior of the chamber 212 is vented to the atmosphere through the longitudinal passage 240. It is to be noted although the regulator assembly 206 is shown as being substantially self-contained and thus will find particularly useful application in providing an extremely compact control console within the associated vehicle, it is contemplated that the pressure switch, i.e. switch 226, could be located at some remote location for certain types of applications without departing from the present invention. It is also to be noted that while the assembly 206 is not shown as being in operative association with a pressure gauge, such as the gauge assembly 64 hereinabove described, it is conceivable that the bezel 204 associated with the assembly 206 could be provided with such a gauge with the same being communicable, for example with the chamber 212, via an outlet port similar to the port 214. As was the case with the leveling system 10, the leveling system 200 is not intended to be necessarily limited to an application at the rear suspension of a vehicle, since it will find ready application in connection with leveling struts associated with the front end of a vehicle.

As best seen in FIGS. 1 and 1A, the compressor 18 comprises a body or housing 300 including a compression cylinder 302 within which a reciprocal piston 304 is disposed, the piston 304 being operable via a suitable connecting crank-shaft means or the like (not shown) with the output shaft of an electrical drive motor 306. The upper end of the compression cylinder 302 is provided with an inverted, generally cup-shaped cylinder head 308 the interior of which defines a manifold chamber, generally designated by the numeral 310. Disposed between upper end of the cylinder 302 and the underside of the cylinder head 308 is a valve plate 312 which defines a bore or port 314 communicating the piston cylinder with the chamber 302. The bore 302 is selectively closed by means of a leaf-type check valve element 316 which is secured to the upper side of the plate 312 by means of a suitable screw or the like 318. Means in the form of a suitable O-ring sealing element or the like 320 is provided within a counterbore of the port 314 to provide for positive sealing when the check valve element 316 is in the position shown in FIG. 1A.

As will be appreciated by those skilled in the art, upon upward movement of the piston 304, pressurized air will be forced through the port 314 to open the check valve element 316, whereupon the air will flow into the manifold chamber 310, with the check valve element 316 moving to a closed position to prevent reverse flow of the compressed air through the port 314 during the downward stroke of the piston 304 or at any other time the pressure within the chamber 310 is greater than the pressure within the cylinder 302.

The cylinder head 308 is provided with a pair of fluid fittings 322 and 324 which operatively connect the conduits 30 and 32, respectively, with the interior chamber 310. Additionally, the upper side of the cylinder head 308 is provided with an auxiliary fluid fitting 326 which is communicable with the chamber 310 and functions to operatively support a suitable schrader-type check valve or the like 328 having a removable cover or cap 330 on the upper side thereof. The fitting 326 and valve 328 are adapted to be connected with an auxiliary conduit or the like (not shown) which may be used, for example, for inflating the vehicle tires, air mattresses, or other suitable devices, in a manner well known in the art. One particular feature of the present invention resides in the fact that since the interior of the chamber 310 is connected via the conduit 30 with the pressure gauge assembly 64, said gauge 64 may be used to visually observe the pressure to which any auxiliary devices are inflated via the fitting 326, valve 328 and the aforesaid auxiliary conduit. Moreover, control of the compressor 18 for use in inflating, for example, the vehicle tires, may be conveniently accomplished via the control element 84 which effects energization of the compressor 18 in the manner hereinabove described. Conventionally, although not necessarily, the compressor 18 would be mounted within the engine compartment of the associated vehicle and when it is desired to use the same for inflating a device, it is merely necessary to remove the cap 330 and thereafter attach one end of auxiliary conduit to the valve 328, with the opposite end of the conduit being connected to the device which is to be inflated. Thereafter, the control element 84 is actuated to close the electrical circuit communicating electric energy to the compressor 18, whereupon the compressor 18 will be energized and pressurized air will be supplied via the auxiliary conduit to the device to be inflated. The gauge assembly 64 may be observed so as to determine the pressure to which the device is being inflated and at such time as the desired pressure level has been reached, the control element 84 may be released, thereby effecting de-energization of the compressor 18, as will be appreciated by those skilled in the art.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A vehicle leveling system adapted for varying the attitude between the sprung and unsprung portions of an automotive vehicle,
    said system including a pair of leveling struts interposed between said vehicle portions and operable in response to an increase in fluid pressure supplied thereto to elevate the sprung portion of the vehicle relative to the unsprung portion thereof, and operable in response to a decrease in fluid pressure supplied thereto to lower said sprung vehicle portion relative to said unsprung portion thereof, an electrically energized means for supplying pressurized fluid to said struts and fluid circuit means communicating said electrically energized means with said struts, control means comprising first and second control elements for operating said leveling system and located interiorly of said vehicle at a position accessible to the vehicle operator, said first control element comprising electrical switching means for opening and closing an electrical circuit between said electrically energized fluid pressure supply means and a source of electrical energy, said second control element comprising valve means communicable with said fluid circuit means for selectively connecting said fluid circuit with a location having a pressure that is normally less than the fluid pressure in said fluid circuit, means for providing a visual indication of the fluid pressure in said circuit, and means defining a fluid pressure communicating passage connecting said fluid circuit with both said second control element and said visual indicating means.

2. The invention as set forth in claim 1 wherein said first and second control elements are independently actuatable by a person within the vehicle passenger compartment.

3. The invention as set forth in claim 1 wherein said first and second control elements comprises first and second push buttons.

4. The invention as set forth in claim 1 wherein said electrically energized means comprises an air compressor.

5. The invention as set forth in claim 1 wherein said valve means is operable to communicate said fluid circuit with the atmosphere.

6. The invention as set forth in claim 1 which includes means for mounting said control means adjacent the dashboard of the associated vehicle.

7. The invention as set forth in claim 6 wherein said control means includes a control console having said first and second control elements mounted thereon for access by the vehicle operator.

8. The invention as set forth in claim 7 wherein said control elements comprise first and second push buttons located adjacent to one another on said control console.

9. The invention as set forth in claim 7 wherein said control elements comprise a rotatable manually engageable knob-like member.

10. The invention as set forth in claim 1 which includes a control console, wherein said visual indicating means comprises a pressure gauge mounted within and visible on said console, and which further includes first and second push buttons located adjacent said gauge for operating said first and second control elements.

11. The invention as set forth in claim 7 wherein said one element comprises electrical switching means and said other element comprises fluid valve means.

12. The invention as set forth in claim 11 wherein said first and second control elements comprise push buttons on said console.

13. The invention as set forth in claim 7 which includes a pressure gauge displayed on said console.

14. The invention as set forth in claim 13 which includes a generally T-shaped fitting means operatively connecting said second element, said gauge and said fluid circuit.

15. The invention as set forth in claim 14 wherein said T-shaped fitting means comprises a first leg portion communicable with said fluid circuit, a second leg portion communicable with said gauge and a third leg portion having fluid valve means therein and cooperable with said second control element.

16. The invention as set forth in claim 15 wherein said first and third leg portions are generally longitudinally aligned, and wherein said second leg portion extends at generally right angles to said first and third leg portions.

17. The invention as set forth in claim 16 wherein said fitting means is disposed below said gauge, and wherein said second leg portion extends upwardly from said first and third leg portions and is operatively connected to said gauge.

18. The invention as set forth in claim 16 wherein said valve means comprises a schrader valve having an actuating portion adapted to be selectively actuated by said second control element.

19. The invention as set forth in claim 13 wherein said control console comprises a face, wherein said gauge is displayed on said face, and which includes first and second push buttons disposed below said gauge for selectively operating said one and said other control elements.

20. The invention as set forth in claim 4 wherein said compressor includes means defining a manifold chamber.

21. The invention as set forth in claim 20 which includes first conductor means connecting the interior of said chamber with said leveling struts and second conduit means connecting said chamber with said control means.

22. The invention as set forth in claim 20 which includes check valve means interposed between said compressor and said chamber.

23. The invention as set forth in claim 21 which includes auxiliary fitting means by which an auxiliary conduit may be connected to said manifold chamber for communicating pressurized air to a location remote therefrom.

24. The invention as set forth in claim 23 which includes schrader valve means interposed between the interior of said manifold chamber and said auxiliary fitting.

25. A leveling system control console for use in a leveling system of the type including a pair of fluid pressure operated leveling struts, an electrically energized source pressurized fluid and a fluid circuit communicating the source with the struts, said console including first and second control elements, one of said elements being operable to open and close an electrical circuit between the electrically energized source of pressurized fluid and a source of electrical energy, the other of said control elements being operable to communicate said fluid circuit with a location having a pressure that is lower than the fluid pressure in said fluid circuit, means on said console for providing a visual indication of the pressure in said fluid circuit, and means defining a fluid pressure communicating path connecting said fluid circuit with both said visual indicating means and said other control element.

26. The invention as set forth in claim 25 wherein said one element comprises electrical switching means and said other element comprises fluid valve means.

27. The invention as set forth in claim 26 wherein said first and second control elements comprise push buttons on said console.

28. The invention as set forth in claim 25 wherein said visual indicating means comprises a pressure gauge.

29. The invention as set forth in claim 28 wherein said passage defining means comprises a generally T-shaped fitting means operatively connecting said other element, said gauge and said fluid circuit.

30. The invention as set forth in claim 29 wherein said T-shaped fitting means comprises a first leg portion communicable with said fluid circuit, a second leg portion communicable with said gauge and a third leg portion having fluid valve means therein and cooperable with said other control element.

31. The invention as set forth in claim 30 wherein said first and third leg portions are generally longitudinally aligned, and wherein said second leg portion extends at generally right angles to said first and third leg portions.

32. The invention as set forth in claim 31 wherein said fitting means is disposed below said gauge, and wherein said second leg portion extends upwardly from said first and third leg portions and is operatively connected to said gauge.

33. The invention as set forth in claim 30 wherein said valve means comprises a schrader valve having an actuating portion adapted to be selectively actuated by said other control element.

34. The invention as set forth in claim 28 wherein said control console comprises a face, wherein said gauge is displayed on said face, and which includes first and second push buttons disposed below said gauge for selectively operating said one and said other control elements.

35. A vehicle leveling system adapted for varying the attitude between the sprung and unsprung portions of an automotive vehicle,
said system including a pair of leveling struts interposed between said vehicle portions and operable in response to an increase in fluid pressure supplied thereto to elevate the sprung portion of the vehicle relative to the unsprung portion thereof, and operable in response to a decrease in fluid pressure supplied thereto to lower said sprung vehicle portion relative to said unsprung portion thereof,
an electrically energized air compressor for supplying pressurized fluid to said struts,
said compressor including means defining a manifold chamber and valve means interposed between said compressor and said chamber,
control means comprising first and second control elements for operating said leveling system and located interiorly of said vehicle at a position accessible to the vehicle operator,
first conductor means connecting said chamber with said struts and second conductor means connecting said chamber with said control means,
said first control element comprising electrical switching means for opening and closing an electrical circuit between said electrically energized fluid pressure supply means and a source of electrical energy, and
said second control element comprising valve means communicable with said fluid circuit means for selectively connecting said fluid circuit with a location having a pressure that is normally less than the fluid pressure in said fluid circuit.

36. The invention as set forth in claim 35 wherein said first and second control elements are independently actuatable by a person within the vehicle passenger compartment.

37. The invention as set forth in claim 35 wherein said first and second control elements comprises first and second push buttons.

38. The invention as set forth in claim 35 wherein said electrically energized means comprises an air compressor.

39. The invention as set forth in claim 35 wherein said valve means is operable to communicate said fluid circuit with the atmosphere.

40. The invention as set forth in claim 35 which includes means for mounting said control means adjacent the dashboard of the associated vehicle.

41. The invention as set forth in claim 40 wherein said control means includes a control console having said first and second control elements mounted thereon for access by the vehicle operator.

42. The invention as set forth in claim 41 wherein said control elements comprise first and second push buttons located adjacent to one another on said control console.

43. The invention as set forth in claim 35 which includes visual indicating means for providing a visual indication of the fluid pressure in said fluid circuit.

44. The invention as set forth in claim 35 which includes a control console, a pressure gauge mounted within and visible on said console, and which further includes first and second push buttons located adjacent said gauge for operating said first and second control elements.

45. The invention as set forth in claim 35 wherein said valve means comprises check valve means interposed between said compressor and said chamber.

46. The invention as set forth in claim 35 which includes auxiliary fitting means by which an auxiliary conduit may be connected to said manifold chamber for communicating pressurized air to a location remote therefrom.

47. The invention as set forth in claim 46 which includes schrader valve means interposed between the interior of said manifold chamber and said auxiliary fitting.

* * * * *